United States Patent Office 2,901,502
Patented Aug. 25, 1959

2,901,502

ACETYL AMINO PHENOL STABILIZING GR-A RUBBER LATEX

David W. Young and Harold J. Rose, Westfield, N.J., assignors to Esso Research and Engineering Company, a corporation of Delaware No Drawing. Application June 25, 1954
Serial No. 439,476

1 Claim. (Cl. 260—45.9)

This invention pertains to improvements in synthetic rubber latex dispersions such as are obtained by polymerization of conjugated diolefins or mixtures of conjugated diolefins with other copolymerizable materials in aqueous emulsion and particularly to the stabilization of such latices against degradation.

It is common practice to protect natural rubber against deterioration by atmospheric action by incorporating in the rubber various organic substances such as phenyl-beta-naphthylamine, naphthols, substituted naphthols, substituted phenols, substituted catechols, substituted hydroquinones, alkyl phenol sulfides, ketone-amine condensation products and the like. In order to serve as a natural rubber age resistor, the added agent merely has to possess some anti-oxidant properties and maintain some sort of solubility in the rubber. In addition, the undissolved portions of the agent must be well dispersed mechanically or physically in the viscous rubber medium. The above mentioned age resistors can be added easily to the dry rubbers by simple milling of the two, preferably above the melting point of the stabilizer.

In recent years various methods have been developed for producing synthetic rubbers such as neoprene by the polymerization of chlorobutadiene, and the buna rubbers by the polymerization of conjugated diolefins alone or in combination with styrenes (Buna S) and in combination with acrylonitrile (Buna N or Perbunan). Although these synthetic rubbers differ from natural rubber in certain respects, neoprene and Buna N or Perbunan for example being much more resistant to the action of solvents than natural rubber, they all lend themselves to stabilization in the dry state in substantially the same manner as natural rubber.

On the other hand, the stabilization of synthetic rubber latices is a very different matter from either the stabilization of natural or synthetic rubbers in the dry state or the stabilization of natural rubber latex. The differences in and the complexities of the problems encountered in the stabilization of synthetic rubber latices of the buna type, e.g., butadiene-styrene emulsion copolymers and butadiene-acrylonitrile emulsion copolymers can be appreciated only through a thorough understanding of the factors which render it necessary to stabilize these synthetic latices.

In the first place, it is noted that natural rubber latex requires no additional stabilization to speak of, while in latex form. By its very nature, it represents a dispersion of a high molecular weight, preformed and fully reacted polymer which, besides existing in the complete or substantially complete absence of any monomeric or polymerizable substances, contains various polyamines and phenolic substances which nature has provided in situ. Natural rubber, therefore, requires artificial stabilization only when fabricated into dry rubber articles which are compounded in order to get maximum resistance to aging.

In the preparation of the Buna emulsion polymers, however, very pure and highly reactive unsaturated compounds such as butadiene or isoprene and acrylonitrile or styrene are emulsified in an aqueous medium, say a soap solution, containing appropriate catalysts, accelerators, promoters, etc. and the copolymerization reaction proceeds at a high rate until a rubbery polymer of the desired consistency and physical properties is attained. This is generally at a reaction conversion such that a considerable proportion, generally about 25% of the original monomers, remain unreacted, but in a medium or system which is still highly conducive to reaction. In addition, the polymer chains themselves contain many unsaturated side vinyl groups ($-CH=CH_2$ of high reactivity which are not believed to be present in natural rubber. These side vinyl groups which are present in the emulsion polymerizates of the buna type easily form cross linkages between polymer chains leading to undesirable tough and insoluble (gelled) rubbers unless these undesirable side reactions or "after-polymerizations" are prevented by proper stabilizing or "short-stopping" the polymerization system. This involves not only neutralizing or inhibiting the chain-initiating processes going on in the liquid phase but similar chain initiating, cross-linking or growth mechanisms going on in the dispersed polymer phase. Since these conditions do not exist perceptibly in natural rubber latex, it may readily be seen why stabilization of these synthetic latices presents a problem which was not encountered until synthetic rubber latices were developed.

When a good dispersion of phenyl-beta-naphthylamine crystals, such as are obtained by extended ball-milling of the crystals in a soap solution and possessing uniform particle size of the order of 1 micron diameter, is added to natural rubber latex, also of particle size about 1 micron diameter, the stabilizer remains well dispersed, as can be determined by viewing a specimen under high magnification (500×) in polarized light between crossed-Nicol prisms. This good compatibility is possibly attributable to the fact that the masses of the stabilizer and natural rubber particles are about the same, and the interfacial area per particle is about the same, the emulsifier being shared by both. On the other hand, when the same stabilizer dispersion (e.g., phenyl-beta-naphthylamine in sodium oleate medium) is added to a latex of a butadiene-acrylonitrile copolymer prepared with sodium oleate as the emulsifier, immediate and usually fairly complete agglomeration of the stabilizer occurs. Consequently, good short-stopping or stabilization of these latices is impossible because too little surface of the stabilizer remains exposed to permit adequate diffusion of the stabilizer throughout the aqueous medium and into the polymer phase. This agglomeration is usually so severe that it can be observed to occur with the unaided eye, and on standing the bulk of the stabilizer will separate from the rubber latex.

The same is on the whole true of all the commercial rubber stabilizers available. The reason for this stabilizer agglomeration appears rather clearly associated with the extremely small particle size and large interfacial area of the Buna rubber particles relative to the stabilizer particles. Whereas the particle size of the dispersed stabilizer particles is of the order of 1 micron, the size of the butadiene-acrylonitrile or butadiene-styrene copolymer particles range from 0.025 to about 0.08 micron diameter. Therefore in a butadiene-acrylonitrile latex to which has been added about 2% of stabilizer based on the rubber present there are about one million such rubber particles for each single stabilizer particle present. In consequence of the tremendous preponderance of interface of the rubber relative to the stabilizer interface, the rubber latex particles rob the stabilizer of its dispersing agent and cause selective agglomeration of the stabilizer. This explanation is confirmed by the fact that if the Buna rubber latex is titrated with additional soap (in the usual commercial latices of this type the rubber particle interface is only partially satisfied by adsorbed soap due to a deficiency of the latter) until the total interface is fully satisfied with regard to adsorbed soap films, then the customary stabilizer dispersions can be added without coagulation occurring. However, this is rather impractical since it necessitates raising the total soap content of the latex to an amount too large to be economically feasible. It may thus be seen that the extremely small size of the synthetic rubber latex particles makes for an additional problem in latex stabilization that is not encountered with natural rubber latex.

It is the object of this invention to provide the art with an antioxidant for synthetic rubber latices which will efficiently terminate the reaction, inhibit further reaction while monomers are present and prevent the deterioration of the polymer particles in the latex form.

It is also the object of this invention to provide the art with hydrocarbon soluble type organic antioxidants which may be readily and uniformly dispersed throughout synthetic latices obtained by the polymerization of highly reactive diolefinic and vinyl compounds in aqueous emulsion.

It is also the object of this invention to stabilize synthetic emulsion polymer latices of the buna type against after-polymerization and other deterioration by adding thereto, as soon as possible after the necessary reactions have been concluded, dispersions, or solutions capable of forming dispersions when added to the latex, of antioxidants of the type described below.

These and other objects will appear more clearly from the detailed specification and claim which follow. It has now been found, after testing a large number of commercial and experimentally prepared stabilizer dispersions, that one type of stabilizer dispersion displays an outstanding degree of compatibility with buna type latices, this being dispersions of the acetyl amino phenols. Although this general type of material has heretofore been proposed for the stabilization of dry rubber, along with many other organic substances, it is considered entirely unexpected that dispersions of these particular materials should prove to be more compatible with buna latices than the numerous other types of dispersed stabilizers and antioxidants such as the arylamines and the like. In fact the compatibility of the acetyl amino phenols with buna latex is excellent and even on prolonged standing or on visual inspection under the polarizing microscope between crossed-Nicol prisms there is absolutely no tendency toward agglomeration, presumably (but not necessarily) because the interfacial adsorptive power of the acetyl amino phenols for emulsifiers is much greater than that of the other types of stabilizers.

The specific type of stabilizer we have found to be suitable for the stabilization of buna latices is produced by reacting an approximately equimolar amount of acetic acid in the presence of a water-entraining solvent such as benzene, toluene or xylene with an aminophenol. The solid product is then dehydrated by evaporation and the product is obtained in relatively pure form. The material found eminently satisfactory is the acetyl-para-aminophenol which in reasonably pure form (though possibly containing different isomers) is a crystalline solid melting at 168–69° C.

The usual short-stopping agent is suitable not only for stabilizing the polymer in latex form but also for stabilizing the polymer in solid or dry form. However, the acetyl amino phenols are water soluble and will, therefore, be retained in the aqueous layer after coagulation of the latex. Consequently it is necessary to also add an additional stabilizer for the solid rubber. A particularly suitable stabilizer is any of the oil-soluble, water-insoluble acyl-para-aminophenols. The oil soluble compounds are those in which the acyl component has at least three carbon atoms. Such compounds are covered by U.S. Patent 2,654,722, issued to David W. Young and Delmer L. Cottle on October 6, 1953. The disclosure of this patent is hereby incorporated herein by reference and should be consulted for details on the preparation and use of these compounds as rubber antioxidants. Particularly effective compounds disclosed therein are N-lauroyl-para-amino-phenol, acetyl-para-amino cardinol, and N-stearoyl-para-amino-phenol.

In its preferred form, therefore, the invention is concerned with the addition to the synthetic latex of both a latex stabilizer and a water-insoluble antioxidant. Generally, a mixture is made of 10 to 90% of the acetyl-para-amino-phenol to 90 to 10% of the water-insoluble acyl-para-amino-phenol and the mixture added to the latex as the stabilizer. However, if desired, the acetyl-para-amino-phenol may be added to the latex alone, and the antioxidant may be added after coagulation, as by blending on the mill. Generally, however, it is more convenient to add both stabilizers as above described.

This invention is applicable to synthetic rubber latices which are prepared, as is well known, by the polymerization in aqueous emulsion, of conjugated diolefins such as butadiene-1,3, isoprene, piperylene, dimethyl butadiene, methyl pentadiene and the like taken singly or in combination and in admixture with other polymerizable compounds such as styrene, alpha methyl styrene, para methyl styrene, alpha methyl para methyl styrene, halogenated styrenes such as chloro- or bromo-styrene, acrylonitrile, methacrylonitrile, acrylic acid and methacrylic acid esters such as methyl acrylate and methyl methacrylate, fumaric acid esters such as ethyl fumarate, and unsaturated ketones such as methyl vinyl ketone and methyl isopropenyl ketone and also to resin latices prepared by polymerizing monoolefins such as styrene, methyl methacrylate, methyl isopropanyl ketone and the like in aqueous emulsion. It is also applicable to these latices before, during or after creaming as described in U.S. Patent 2,444,801, filed September 30, 1944, by E. Arundale. These latices will be referred to hereinafter as synthetic latices or synthetic rubber latices of the buna type and are not to be confused with any artificial latices prepared by dispersing solid polymerizates whether natural or synthetic in nature.

The synthetic rubber latices which are stabilized in accordance with this invention are prepared by emulsifying the reactants in from about an equal to a two-fold quantity of water using as the emulsifier water-soluble soaps such as alkali metal or ammonium oleates, stearates, palmitates as well as various surface-active agents such as salts of alkylated naphthalene sulfonic acids, fatty alcohol sulfates, salts of aliphatic and olefinic sulfonic acids and also acid addition salts of high molecular alkyl amines. The amount of emulsifier used is ordinarily about 0.5 to about 5 weight percent based on the reactants. A polymerization catalyst such as benzoyl peroxide, hydrogen peroxide and alkali metal or ammonium perborates or persulfates or the like are provided in the reaction mixture in amounts of about 0.05 to about 0.6 weight percent based on reactants. It is ordinarily preferred to provide a suitable polymerization modifier or promoter such as dialkyl xanthogen disulfides or aliphatic mercaptans containing at least 7 carbon atoms in an aliphatic linkage such as heptyl, octyl, decyl, dodecyl, Lorol or benzyl mercaptan in the reaction mixture in amounts of between about 0.2 to about 1.0 weight percent based upon the reactants present. The reaction mixture is maintained at the desired temperature of between about 15° C. and about 65° C. for a length of time sufficient to convert a major proportion, generally about 75%, of the reactants to a rubbery polymer of the desired consistency. Ordinarily, about 12 to about 18 hours are required to reach this conversion. The proportions of materials used, temperatures, times of reaction, etc. are well known or understood by the art and form no part of the present invention.

When the desired conversion level is reached, a polymer stabilizer of the type disclosed above is added. The latex may then be stripped of unreacted monomers by subjecting to steam-distillation, preferably under reduced pressure.

The stabilizer may be prepared in the form of a dispersion for addition to the reaction mixture by grinding the stabilizers in a ball or colloid mill in the presence of soap or other dispersing agent and in the presence, if desired, of suitable protective colloids such as glue or the like. Instead of dispersing the stabilizer in the foregoing manner, it may be dissolved in a suitable solvent such as aromatic hydrocarbons, alcohols, of at least four carbon atoms, etc., which will form a satisfactory dispersion when added to the latex. The amount of stabilizer added is ordinarily about 0.1% to 3% based on the rubber although larger amounts such as up to about 6–7% may be used.

The advantages of the present invention will become apparent from the following specific examples which are illustrative of this invention.

EXAMPLE I

A butadiene-acrylonitrile latex at a pH of about 8.0–8.4 containing about 25% of rubber solids and 2½% of sodium oleate, based on the water, was prepared by copolymerizing butadiene and acrylonitrile in approximately a 3 to 1 molar ratio, the polymerization being carried to approximately a 75% conversion of monomers to polymers. To this latex was then added a minor proportion of a ball-mill dispersion of 33% by weight of phenyl-beta-naphthylamine in 5% sodium oleate solution of very fine particle size, the amount of stabilizer being approximately 2% based on the rubber present. After the stabilizer dispersion had been stirred in thoroughly a drop of the mixture, when examined under the microscope was found to contain most of the stabilizer particles in the form of large clusters or agglomerates. This condition was visible wtih the unaided eye on close examination. When the latex was allowed to stand undisturbed, the bulk of the stabilizer agglomerates settled. As shown in a later example, this condition does not lead to adequate stabilization. When this experiment was repeated using the latex of an emulsion copolymer of butadiene and styrene, a similar behavior was observed. Similar dispersions of other commercial rubber antioxidants of the aromatic amine type such as the condensation products of acetone with diphenylamine, or of a ketone with phenyl-beta-naphthylamine, known to the trade as "Aminox" and "Beta-nox," respectively, and the like were added to Buna latices and in every case agglomeration of the stabilizer occurred. Also, when ball-mill dispersions of phenyl-beta-naphthylamine in a large number of sulfated and sulfonated and natural emulsifying agents were tested, the same type and about the same degree of agglomeration occurred.

EXAMPLE II

A butadiene-acrylonitrile latex was prepared by copolymerizing butadiene and acrylonitrile in accordance with the following recipe:

| | |
|---|---|
| Butadiene | 62% by weight. |
| Acrylonitrile | 38% by weight. |
| Soap | 3.85 parts by weight based on monomer. |
| Catalyst | 0.3 parts by weight based on monomer. |
| n-Dodecyl mercaptan | 0.75 parts by weight based on monomer. |
| Water | 200 parts by weight based on monomer. |

17 hours at 80° F.

The polymerization was carried to approximately 60% conversion of monomers to polymers. To samples of the latex were then added minor proportions of various short-stopping agents after which the samples were held for five additional hours at 100° F. At the end of this time the latex was stabilized with phenyl-beta-naphthylamine, coagulated, worked up and dried. The following results were obtained.

Table I

EVALUATION OF ACETYL-P-AMINOPHENOL, ACETYL-P-AMINOCARDINOL, AND HYDROXYLAMMONIUM SULFATE AS SHORTSTOPS IN PARACRIL-35 [a]

| Shortstop Identification | Percent on Monomers [c] | At Hour 22 [b] Percent Conversion | At Hour 22 [b] Mooney, 2 Min. | Bottle Polymerization Run No. |
|---|---|---|---|---|
| Hydroquinone [d] | 0.2 | 60 | 62 | 484-21 |
| Hydroxylamine Hydrochloride [e] | 0.1 | 60 | 52 | 484-43 |
| Hydroxylammonium Sulfate [f] | 0.12 | 60 | 48 | 484-34 |
|  | 0.24 | 60 | 52 | 484-5 |
| Acetyl-p-aminocardinol [g] | 0.1 | 91 | 79 | 484-16 |
|  | 1.0 | 79 | 44 | 484-44 |
| Acetyl-p-aminophenol [g] | 0.1 | 61 | 59 | 484-3 |
|  | 1.0 | 61 | 43 | 484-14 |
| None (Off at Hour 22) |  | 89 | 68 | 484-9 |

[a] Synthesis recipe:
Butadiene ---------------------------------------- 62
Acrylonitrile -------------------------------------- 38
Soap --------------------------------------------- 3.85
Catalyst ------------------------------------------ 0.3
n-Dodecyl Mercaptan ------------------------------ 0.75
Water -------------------------------------------- 200
Reaction: 17 hours @ 80° F. plus 5 hours @ 100° F.
[b] At hour 22 latex stabilized with phenyl beta naphthylamine, coagulated, worked up, and dried.
[c] Injected into bottles at hour 17. Bottle 484-51 taken off at hour 17 was 62% conversion and 55 Mooney.
[d] Added as a 5% solution in water.
[e] Added as a 1% preneutralized solution.
[f] Added as a 1.2% preneutralized solution.
[g] Added as 10% dispersion in a 5% sodium oleate solution.

The above data show that acetyl-para-aminophenol is effective as a shortstopping agent at concentrations as low as 0.1% on monomers. Higher molecular weight compounds such as acetyl-para-amino-cardinol are not effective even at 1.0% concentration.

The nature and objects of the present invention having been thus fully set forth and specific examples of the same given, what is claimed as new and useful and desired to be secured by Letters Patent is:

A method which comprises polymerizing in aqueous emulsion a mixture of a major proportion of butadiene-1,3 and a minor proportion of acrylonitrile to form a synthetic rubber latex, adding to the latex 0.1 to 2.0% based on the weight of rubber of an acetyl-amino-phenol, and thereafter stripping the latex of unreacted monomer by means of a gaseous stripping agent at a temperature between 60 and 70° C.

References Cited in the file of this patent

UNITED STATES PATENTS

| | | |
|---|---|---|
| 2,264,173 | Collins | Nov. 25, 1941 |
| 2,393,133 | White | Jan. 15, 1946 |
| 2,654,722 | Young et al. | Oct. 6, 1953 |
| 2,730,500 | Young et al. | Jan. 10, 1956 |

OTHER REFERENCES

Dunbrook et al.: Abstract of Serial No. 767,360, 644 O.G. 622, March 13, 1951.